United States Patent [19]
Kasim

[11] Patent Number: 5,619,810
[45] Date of Patent: Apr. 15, 1997

[54] PIN RETENTION DEVICE AND RELATED METHOD FOR RETAINING A TRUNNION LINK PIN IN A DIGGING IMPLEMENT

[75] Inventor: Rikos A. Kasim, Mukwonago, Wis.

[73] Assignee: Harnischfeger Corporation, Brookfield, Wis.

[21] Appl. No.: 558,555

[22] Filed: Dec. 4, 1995

[51] Int. Cl.$^6$ .................................... E02F 3/60
[52] U.S. Cl. .................. 37/399; 37/396; 37/444; 403/154
[58] Field of Search .............. 37/399, 398, 396, 37/397, 444; 403/342, 343, 156, 154; 411/402, 408, 409

[56] References Cited

U.S. PATENT DOCUMENTS

| | | | |
|---|---|---|---|
| 1,050,838 | 1/1913 | King et al. | 37/396 |
| 1,496,407 | 6/1924 | Black | 37/444 |
| 1,716,432 | 6/1929 | Downie | 37/444 X |
| 1,777,624 | 10/1930 | Phillips | 384/417 |
| 1,844,858 | 2/1932 | Lehman | 37/399 |
| 2,001,924 | 5/1935 | Strong | 37/396 |
| 2,092,556 | 9/1937 | Page | 37/135 |
| 2,639,622 | 5/1953 | Ginder | 411/409 X |
| 2,909,352 | 10/1959 | Van Buren, Jr. | 248/239 |
| 3,112,572 | 12/1963 | Larsen | 37/135 |
| 3,543,863 | 12/1970 | Ball | 414/723 X |
| 3,554,588 | 1/1971 | Reinsma et al. | 403/154 |
| 3,600,015 | 8/1971 | McMullen | 403/156 |
| 4,022,536 | 5/1977 | Piepho et al. | 403/154 X |
| 4,092,074 | 5/1978 | Harper et al. | 403/154 X |
| 4,096,957 | 6/1978 | Iverson et al. | 403/154 X |
| 4,282,664 | 8/1981 | Thiele et al. | 37/444 |
| 4,491,436 | 1/1985 | Easton | 403/154 X |
| 4,638,994 | 1/1987 | Gogarty | 403/343 X |
| 4,939,855 | 7/1990 | McCreary, Jr. | 37/444 |
| 5,205,667 | 4/1993 | Montgomery, Sr. | 403/154 X |

Primary Examiner—Randolph A. Reese
Assistant Examiner—Thomas Beach

[57] ABSTRACT

Disclosed is a digging implement (such as a dragline bucket) having a trunnion link connected to the implement by a pin secured in place by a retention device. Such device is coupled to the pin along the pin longitudinal axis. The pin has a first portion engaging the implement and having internal threads and the retention device has a stop member and an exteriorly-threaded stem extending therefrom. The stem is threaded to the internal threads of the first portion. Preferably, the stop member is recessed in a protective pocket which helps protect the retention device from damage otherwise caused by material being handled by the implement.

15 Claims, 6 Drawing Sheets

PIN RETENTION DEVICE AND RELATED METHOD FOR RETAINING A TRUNNION LINK PIN IN A DIGGING IMPLEMENT

FIELD OF THE INVENTION

This invention relates generally to joints and connections and, more particularly, to joints and connections having relatively-movable members pin-connected to one another.

BACKGROUND OF THE INVENTION

Many types of machines and machine accessories have components which move relative to one another or to some other part of the machine. Components involving linear or pivoting relative movement are abundant.

One type of machine having parts involving relative pivoting movement is known as a dragline, a type of excavating machine equipped with an extending boom from which is suspended a digging bucket. To excavate, the bucket is placed on the ground away from the machine. With its teeth rearward (facing the machine), such bucket is drawn (or "dragged") toward such machine by taut cable. When the bucket is filled, it is hoisted by other taut cables and the machine is then rotated to dump the bucket contents on a spoil pile.

During digging and later bucket emptying, such bucket must assume a variety of "attitudes," i.e., a horizontal position to dig and a steeply-angled or vertical position to empty. The hoisting cables are attached to chain-link "rigging" which, in turn, is attached to an eye-like link at the end of the rigging. The link couples to a clevis or (in another configuration) to a bracket-like bucket trunnion using a pin which engages the clevis and link or the bucket trunnion and link, as the case may be. Such arrangement permits the bucket to be supported by the rigging and the hoisting cables and yet assume the positions required for digging and bucket emptying.

The trunnion link, bucket and bucket trunnion are subjected to extraordinary wear and impact. (In fact, it is difficult to envision the rigors of bucket service without actually having seen a dragline in operation.)

Notwithstanding the rigors of hard service, it is important that the pivot pin be securely retained so that the trunnion and link do not separate from one another. But when the pin is worn to the point that it must be replaced, the structure retaining such pin is preferably configured to be quick and easy to remove and replace. A large dragline may represent a capital expenditure of several million dollars—machine downtime is very expensive.

While generally satisfactory, prior art arrangements for retaining a pin have some deficiencies, at least with respect to ease of parts replacement including pin or link replacement. In one arrangement, the cylindrical pivot pin has a cap-like head on either end and one of such heads is welded to the pin after the bucket and rigging are assembled in the field. The heads prevent the pin from falling out.

There are two disadvantages to this approach. One is that to replace a pin, one has to "cut" the welded head from the pin (by using an acetylene torch, for example) and weld a head on an end of the replacement pin after such pin is installed. This is time consuming and requires that flame cutting equipment and a person skilled as a welder be available on the site.

Another disadvantage to the "welded head" approach is that the hardness of the pin cannot exceed some maximum, e.g., about 400–450 Brinell. A pin of such hardness does not wear as well as desired and it must be replaced with a frequency that with the advent of the invention is unnecessary.

In an arrangement involving a link, clevis and retaining pin, another approach to pin retention involves using a cylindrical pin without welded heads and mounting a cover at each side of the clevis and over each end of the pin. The cover mounts tongue-and-groove fashion on straight tracks affixed to the clevis. After being properly positioned, the covers are welded in place.

While this approach avoids pin welding (and therefore permits using a pin having a hardness of about 650 Brinell), it does not avoid welding altogether. As a consequence, the user of such approach is likely to experience at least some of the downtime, equipment and personnel availability problems mentioned above.

Another prior art arrangement of the type involving a bucket-mounted trunnion, a link and a pin securing the trunnion and link to one another has a similar disadvantage. In this arrangement, the pin is prevented from working its way out in one direction by a pin shoulder which bears against the bucket. The pin is prevented from working its way out in the other direction by a welded-in-place cover plate of the type described above.

Such arrangement is attended by the disadvantages mentioned above with respect to the welded-cover approaches. And it has been found that when a bucket-mounted trunnion is used to connect a link and bucket to one another, the outer surface of the trunnion becomes caked with mud which hardens (over the welded cover) and is very difficult to remove.

An improved pin-retention device and method which avoid welding when installing or replacing a pin in the field, which reduce downtime and which involve only commonly-available tools and personnel skills would be an important advance in the art.

OBJECTS OF THE INVENTION

It is an object of the invention to provide an improved pin-retention device and method overcoming some of the problems and shortcomings of the prior art.

Another object of the invention is to provide an improved pin-retention device and method which require only commonly-available tools for their use.

Another object of the invention is to provide an improved pin-retention device and method which avoid using metal welding and flame cutting equipment.

Still another object of the invention is to provide an improved pin-retention device and method which reduces machine downtime.

Another object of the invention is to provide an improved pin-retention device and method facilitating easy, quick repair of bucket rigging.

Yet another object of the invention is to provide an improved pin-retention device and method which requires no specially-trained personnel, e.g., welders.

Another object of the invention is to provide an improved pin-retention device and method which securely retains the pin.

Another object of the invention is to provide an improved pin-retention device and method which permits using a hardened pin for improved pin life.

How these and other objects are accomplished will become apparent from the following descriptions and from the drawings.

SUMMARY OF THE INVENTION

The invention involves a digging implement having a trunnion link connected to the implement by a pin. The pin is generally cylindrical, has a longitudinal axis and is secured to the implement by a retention device. In the improved device, the retention device is coupled to the pin along the longitudinal axis.

The pin includes a somewhat "necked-down" first portion engaging the implement and a head-free second portion (enlarged with respect to the first portion) that engages the trunnion link. When the retention device is coupled to the pin at the first end of such pin, such device exerts "pull" on the first portion. Such portion is thereby in tension. There is a pin shoulder between the portions and the shoulder bears against the implement, resulting in a "reaction force" resisting pulling force imposed on the first portion by the retention device.

In a more specific aspect of the invention, the first portion is internally threaded and the retention device has a generally cylindrical stem which is externally threaded. For pin retention, the stem is threaded to the first portion.

In a highly preferred embodiment, the retention device includes a stop member extending laterally to the stem. Such stop member bears against the implement, limits travel of the retention device and provides a reaction-force surface, the presence of which permits the device to exert tensioning force on the pin.

A feature of the invention is that the retention device is easy to install and remove. To that end, the stop member includes a gripping portion permitting hand rotation of the retention device for threading such device into the pin or for removing such device. In a highly preferred embodiment, the implement includes a pocket in which the stop member is recessed when the pin and its retention device are coupled together ready for use. "Nesting" the stop member in the pocket helps protect the device from damage otherwise imposed by the materials, e.g., rock, soil and the like, being handled by the implement.

And the inventive retention device may be considered in another way. Such device (connecting a digging implement and a trunnion link to one another) includes a pin engaging the digging implement and having the trunnion link therearound. The pin has a threaded portion extending along the pin long axis. A retention device has a threaded stem engaging the threaded portion along the axis and preventing the pin from becoming disengaged from the implement.

A new method for retaining the pin in the digging implement includes the steps of providing a pin having a threaded portion extending along its long axis, providing a retention device having a threaded stem and coupling the stem and the portion together by rotating the pin and the device relative to one another. In a more specific aspect of the method, the implement has first and second surfaces spaced from one another and the coupling step includes rotating the pin and the device relative to one another until the pin bears against the first surface and the device bears against the second surface.

Most preferably (for protecting the retention device), the implement includes a pocket, the retention device includes a stop member and the coupling step includes rotating the pin and the device relative to one another until the stop member is substantially recessed in the pocket. In an implement having the aforementioned pocket, the second surface forms the bottom of the pocket. In a digging implement embodied as a dragline bucket, the pin is quite large and is held substantially stationary. For pin retention, the device is rotated with respect to such pin.

Further details of the invention are set forth in the following detailed description and in the drawings.

DETAILED DESCRIPTIONS OF PREFERRED EMBODIMENTS

Figure 1:
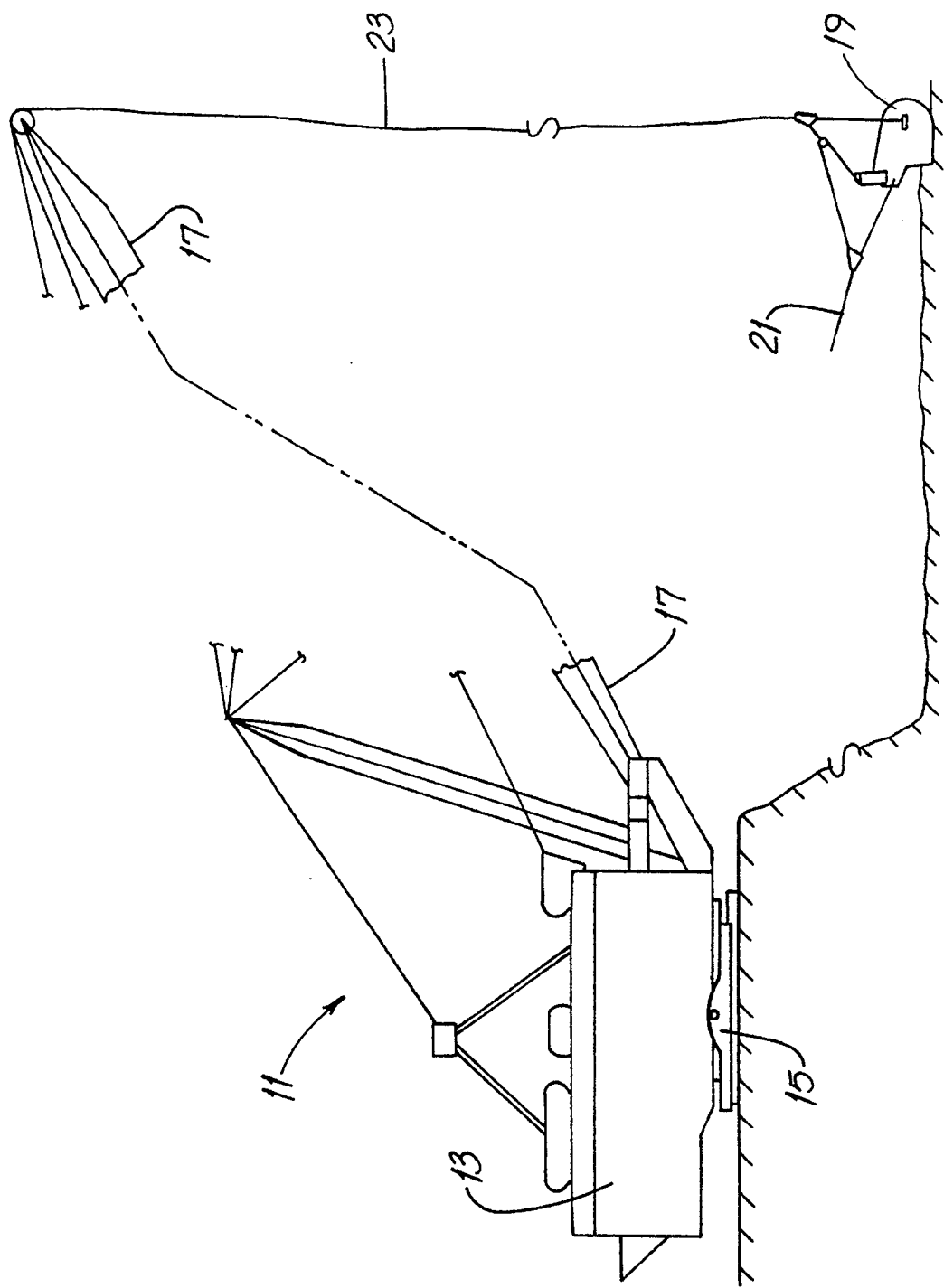
FIG. 1 is a representative side elevation view of an exemplary machine, a dragline, with which the invention may beneficially be used. Parts are broken away.
Figure 2:
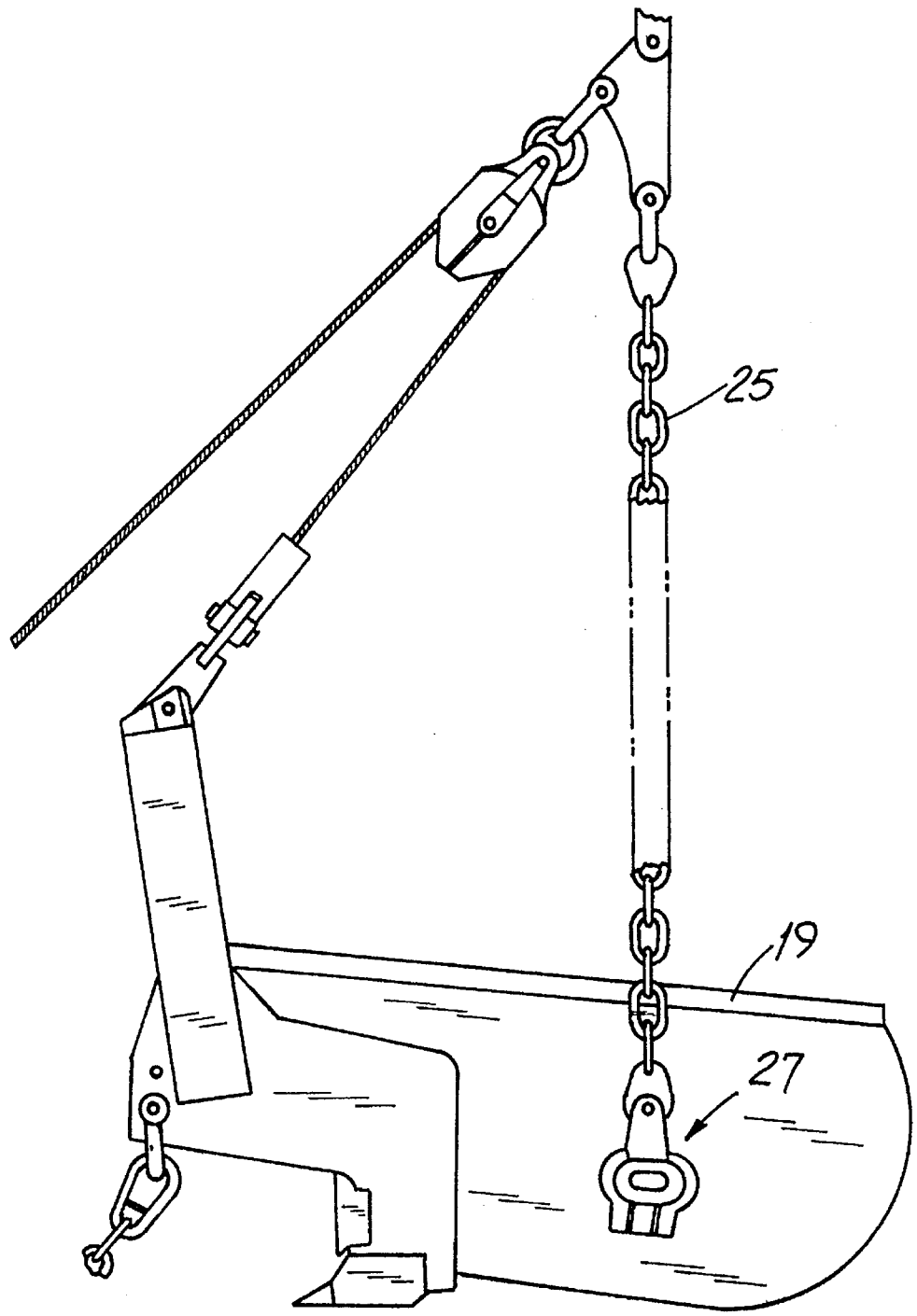
FIG. 2 is a side elevation view of the dragline bucket and its associated rigging as shown in FIG. 1. Parts are broken away.

Before describing the new pin-retaining device 10 and method for retaining a pin, it will be helpful to have an understanding of one type of machine that benefits from the invention. Referring to FIGS. 1 and 2, the machine 11 is an exemplary dragline having an upper machinery housing 13 which pivots on a base 15. The extended boom 17 supports and manipulates a digging bucket 19 which, in preparation for digging, is placed away from the machine 11 as generally shown in FIG. 1.

As the rear-facing bucket 19 is drawn toward the machine 11 by the cable 21, such bucket 19 fills with rock, earth, coal or the like. And when it is filled, the bucket 19 is hoisted by the cable 23 and the machine 11 pivoted in one direction or the other so that the contents of the bucket 19 may be placed on a spoil pile.

Referring particularly to FIG. 2, the bucket 19 includes rigging 25 used to suspend the bucket 19 from the cable 23. The rigging 25 and the bucket 19 are pivotably secured to one another by what might be termed a "pin-and-eye" arrangement 27.

Details of the new pin retention device 10 will now be set forth. Referring to FIGS. 2, 3, 4 and 5, the bucket 19 has a side wall 29 to which is rigidly attached a bracket-like trunnion 31. The trunnion 31 has a mounting plate 33 spaced from the side wall 29 and the trunnion link 35 fits into the space between the plate 33 and wall 29. The wall 29 and the plate 33 each have an aperture 37, 39, respectively, formed therein for receiving a pin 41 attaching the link 35 and the trunnion 31 to one another.

While the pin 41 is generally cylindrical, it has first and second portions 45, 47, respectively, of slightly differing diameters. An annular shoulder 49 is between the portions 45, 47. The diameters of the portions 45 and 47 and the diameters of the respective apertures 39 and 37 are cooperatively sized so that each portion 45 or 47 is received into its respective aperture 39 or 37 with slight clearance. When the trunnion link 35 and pin 41 are in position for use, the pin 41 extends through a clearance hole 51 in the link 35; that is, the link 35 is around the pin 41.

Figure 3:
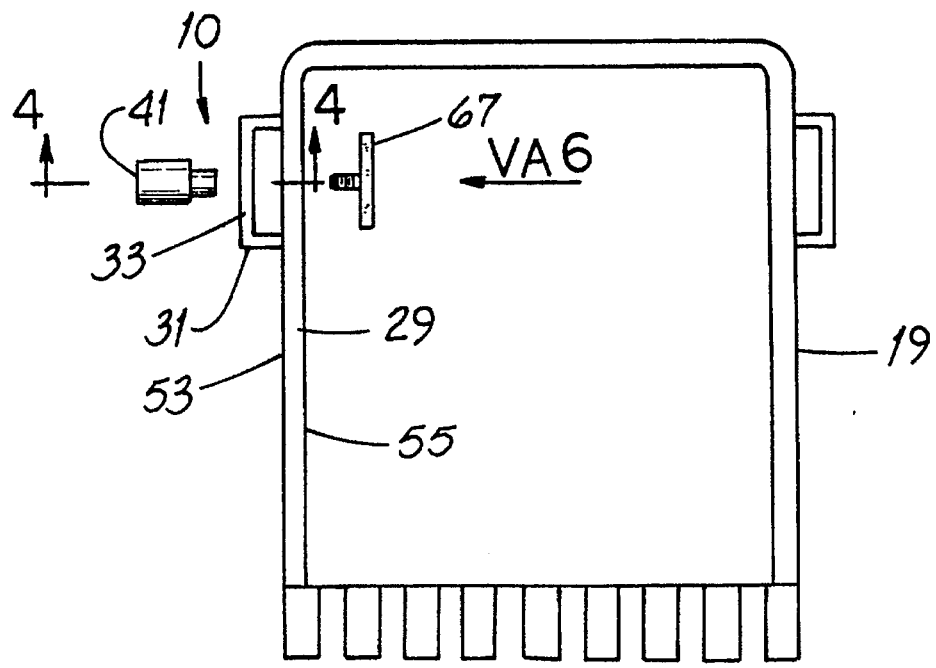
FIG. 3 is a simplified top plan view of the bucket of FIG. 2 shown in conjunction with the new pin-retaining device.
Figure 4:
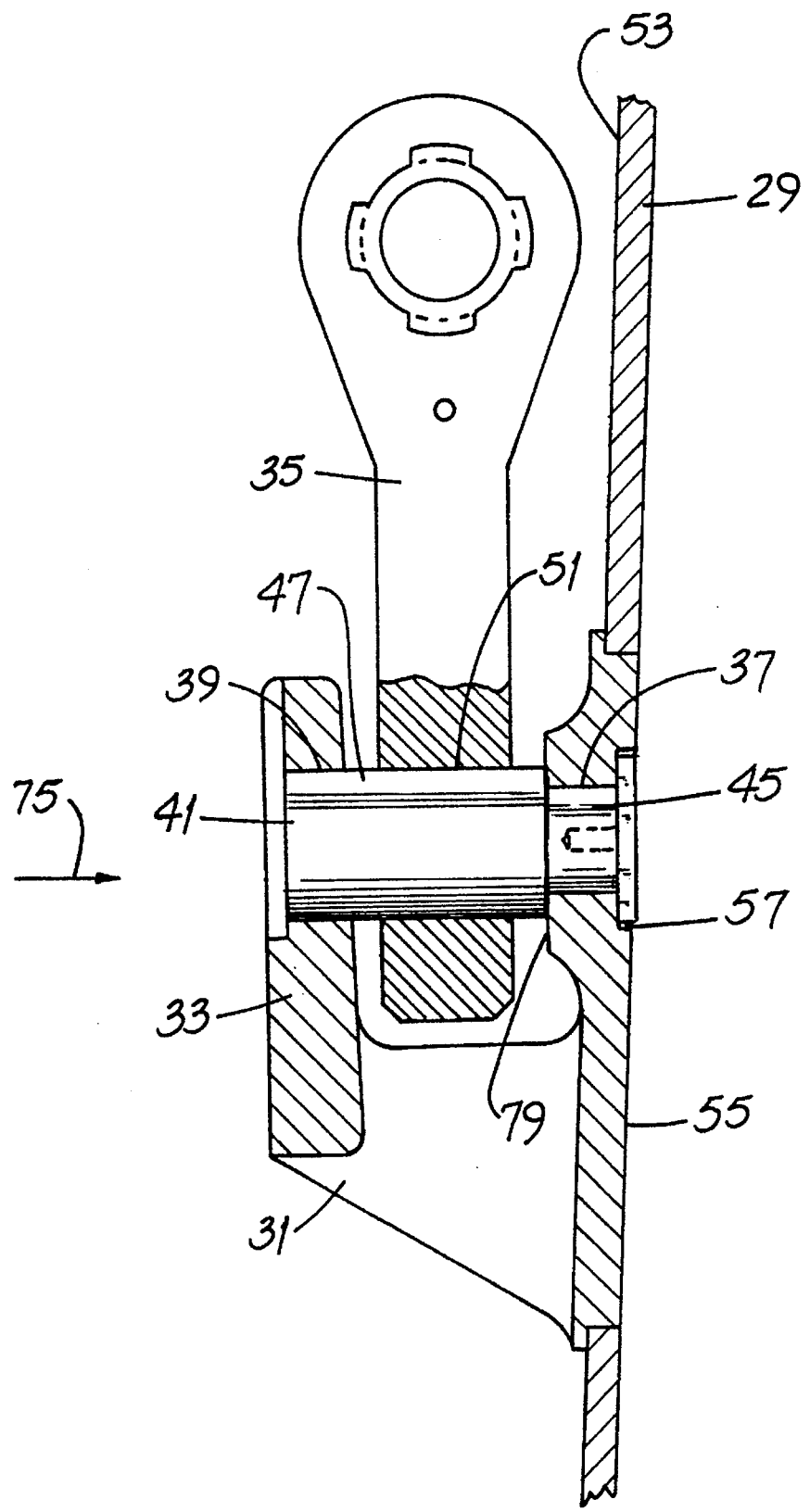
FIG. 4 is a section view of a portion of the bucket and pin-retaining device. Such view is taken generally along the viewing plane 4—4 of FIG. 3. Parts are broken away and other parts are shown in full representation.
Figure 6:
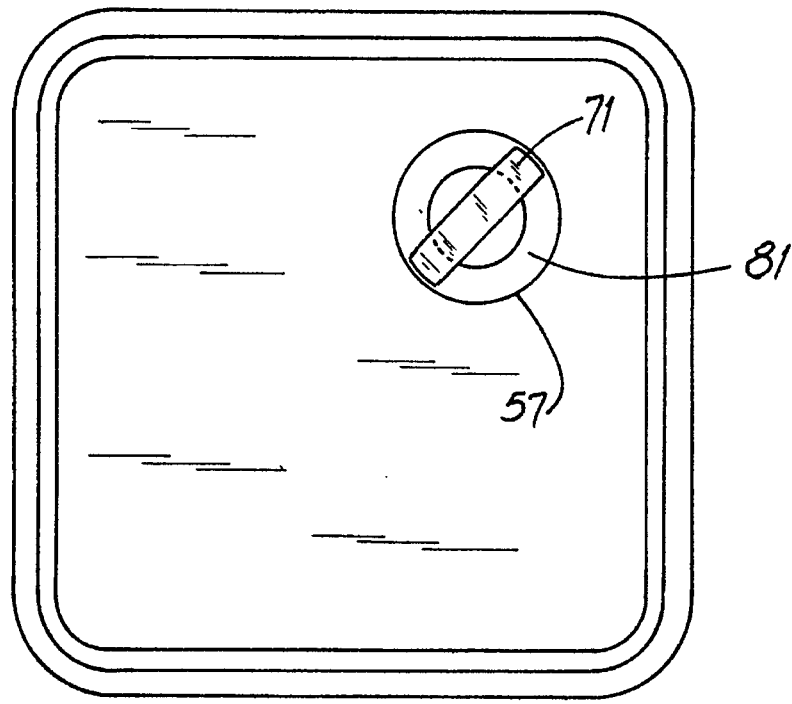
FIG. 6 is a view of the interior wall of the bucket in conjunction with the retention member component of the new retention device. The view is taken along viewing axis VA6 of FIG. 3.

Referring particularly to FIGS. 3, 4 and 6, the bucket side wall 29 has a first or outward surface 53 (facing the plate 33) and a second or inward surface 55 facing the bucket interior. In a highly preferred embodiment, there is a shallow cylindrical pocket 57 formed at the interior surface 55. The purpose of such pocket 57 is described below.

Figure 5:
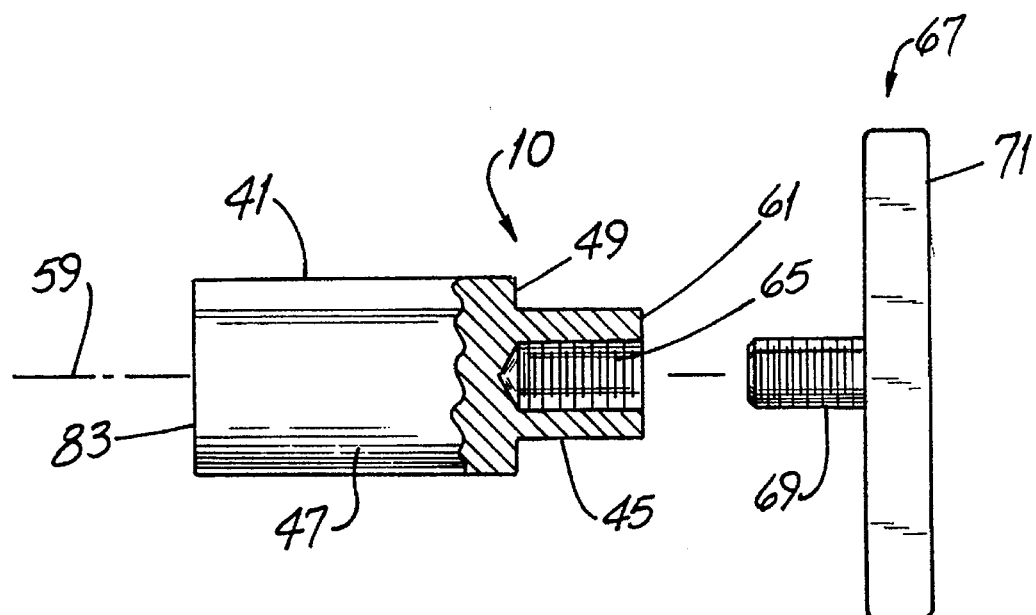
FIG. 5 is an elevation view of the inventive pin-retaining device. Parts are shown in cross-section.

Referring particularly to FIGS. 3 and 5, the pin 41 has a central longitudinal axis 59 and includes a first end 61 generally normal to such axis 59. There is an interior threaded opening 65 formed to a depth in the first portion 45 and extending along the axis 59.

Figure 7:
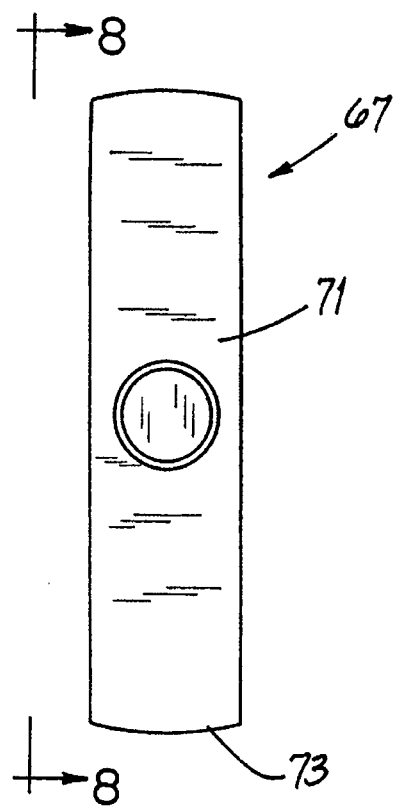
FIG. 7 is a view of the retention member component of the new retention device. The view is taken along viewing axis VA6 of FIG. 3.
Figure 8:
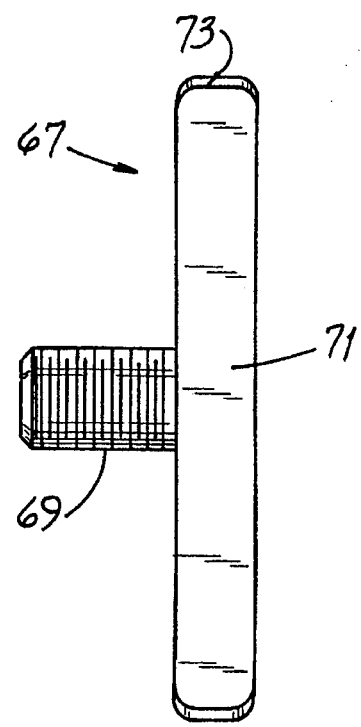
FIG. 8 is an elevation view of the retention member component of FIG. 7 taken along the viewing plane 8—8 thereof.

Referring also to FIGS. 7 and 8, the new retention device 10 has a retention member 67 with an exteriorly-threaded stem 69 which threads into the opening 65 in the pin first portion 45 for pin retention. A stop member 71 extends from the stem 69 and in the embodiment of FIGS. 7 and 8, the stop member 71 is a flat, generally-rectangular bar extending laterally from the stem 69 and generally perpendicular to such stem 69.

Most conveniently, the stop member 71 also forms a hand gripping portion 73 facilitating easy rotation of the member 67 into the pin 41. (Clearly, a tool may be used to engage the gripping portion 73 in very large digging implements—hand rotation may not be practical.)

Referring again to FIGS. 3–6, when the bucket 19 and the link 35 are to be pivotably coupled to one another (either upon initial assembly or to replace a worn or broken part), the hole 51 in the link 35 is aligned with the apertures 37, 39 in the wall 29 and the plate 33. Thereupon, a pin is inserted in the direction of the arrow 75.

When the pin shoulder 49 is closely proximate or against the pin abutment surface 79 (or even when the pin first portion 45 enters the aperture 37), the stem 69 and the pin threaded opening 65 are threaded to one another and the stem 69 and pin first portion 45 are brought together by rotating the pin 41 and the member 67 relative to one another. It is usually easier and preferred to rotate the member 67 relative to the pin 41. Rotation is until the pin shoulder 49 bears against the surface 79 (if not already against such surface 79) and the stop member 71 bears against the second surface 55. In embodiments having a pocket 57 as shown in FIG. 4, the stop member 71 bears against the bottom 81 of the pocket 57.

From FIGS. 4, 6, 7 and 8, it will be appreciated that if the thickness of the stop member 71 and the depth of the pocket 57 are cooperatively selected so that such depth is at least equal to such thickness, the stop member 71 will be essentially recessed in the pocket 57 and better protected from damage. The second end 83 of the pin 41 is simply left exposed.

Figure 9:
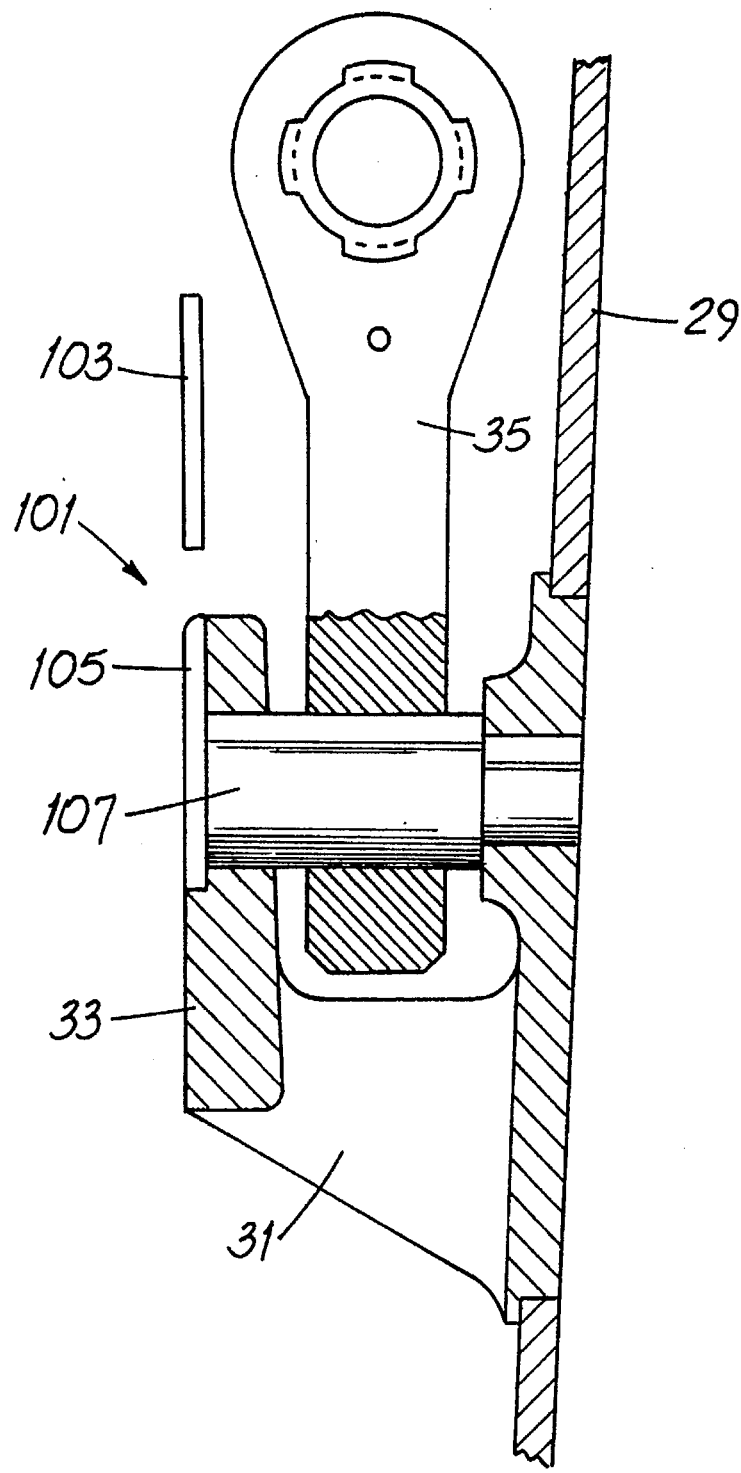
FIG. 9 is a section view of a portion of the bucket and a prior art pin-retaining device. Parts are broken away and other parts are shown in full representation.

FIG. 9 depicts a prior art pin-retention arrangement 101 in which a retaining plate 103 is dovetail fitted into a slot 105 on the exterior of the mounting plate 33 and welded in place. To replace a pin 107, the welds are required to be cut off and, as is always or nearly always the case, a tool of some sort is required to chip caked dried soil from the trunnion 31.

While the principles of the invention have been shown and described in connection with but a few preferred embodiments, it is to be understood clearly that such embodiments are by way of example and are not limiting.

What is claimed:

1. In a digging implement having a trunnion link connected to the implement by a pin and wherein:

the implement has a wall and a trunnion mounting plate away from the wall, such plate and wall defining a space therebetween;

the pin has a longitudinal axis and is secured to the implement by a retention device;

the pin has first and second cylindrical portions of differing diameters, the improvement wherein:

the first portion has an interior threaded opening;

the retention device is threaded to the first portion along the longitudinal axis;

the second portion extends away from the wall and into the space; and the wall is between the second portion and the retention device.

2. The implement of claim 1 wherein:

the first portion engages the wall and the second portion engages the trunnion link; and as to the first and second portions, only the first portion is in tension.

3. The implement of claim 2 wherein:

the pin includes an integral shoulder between the portions; and the shoulder bears against the implement.

4. The implement of claim 1 wherein the retention device is externally threaded and the second portion is free of threads.

5. The implement of claim 1 wherein the retention device includes a threaded stem and a stop member extending radially from the stem and bearing against the implement and limiting travel of the retention device.

6. The implement of claim 5 wherein the retention device is substantial T-shaped and the stop member includes a hand gripping bar, thereby permitting hand rotation of the retention device.

7. The implement of claim 5 wherein:

the implement includes a pocket;

the stop member is recessed in the pocket; and the stop member covers the interior threaded opening.

8. The implement of claim 1 wherein:

the pin includes a first end and a second end;

the retention device covers the first end; and the second end is exposed.

9. The implement of claim 1 wherein:

the first portion engages the implement; and the second portion is free of threads, has a length and is of substantially uniform diameter along the entirety of such length.

10. An improved retention device for connecting a dragline bucket and a trunnion link to one another and wherein the bucket has a wall and the device includes:

a head-free pin engaging the bucket and having the trunnion link around the pin;

the pin includes first and second portions defining a shoulder therebetween;

the device includes a retention member threaded to the first portion;

the wall is clamped between the shoulder and the retention member;

the first portion is in tension; and the second portion is free of tension and extends away from the wall and through a space outward of the wall.

11. A method for retaining a pin in a digging implement having (a) a wall having a wall aperture therethrough, (b) a trunnion permanently mounted to the wall, such trunnion including a mounting plate having a plate aperture therethrough, such plate being away from the wall and defining a space between the plate and the wall, and (c) a trunnion link connected to the implement by the pin and wherein the pin has a longitudinal axis, the method including the steps of:

providing a head-free pin having a length and a threaded first portion of a first diameter along such length, such pin also having a thread-free second portion with a length and a substantially constant second diameter along such length, such second diameter being greater than the first diameter;

providing a retention device having a threaded stem;

extending the first portion through the plate aperture and into the wall aperture, the second portion thereby being aligned with the space; and coupling the stem and the first portion together by rotating the pin and the device relative to one another.

12. The method of claim 11 wherein the implement wall has first and second surfaces spaced from one another, the first and second portions define a shoulder therebetween and the coupling step includes rotating the pin and the device relative to one another until the shoulder bears against the first surface and the device bears against the second surface.

13. The method of claim 11 wherein:

the implement wall includes a pocket having a diameter;

the retention device includes a stop member with a bar-like hand gripping portion having a length slightly less than the diameter; and the coupling step includes rotating the pin and the device relative to one another until the stop member is substantially recessed in the pocket.

14. The method of claim 11 wherein the coupling step includes rotating the device with respect to the pin.

15. The method of claim 13 wherein the coupling step includes rotating the device with respect to the pin.

* * * * *